United States Patent
Qian et al.

(10) Patent No.: US 6,173,643 B1
(45) Date of Patent: Jan. 16, 2001

(54) MULTIFUNCTIONAL ELECTRIC PRESSURE COOKER

(75) Inventors: Anguo Qian; Chunde Tang, both of Zha Jiang Province (CN)

(73) Assignee: Ningbo Tang Ren Cooker Ware Co., Ltd., Ninghai (CN)

(*) Notice: Under 35 U.S.C. 154(b), the term of this patent shall be extended for 0 days.

(21) Appl. No.: 09/369,356

(22) Filed: Aug. 6, 1999

(30) Foreign Application Priority Data

Aug. 10, 1998 (CN) .................................................. 98110999

(51) Int. Cl.⁷ .................................................... F27D 11/02

(52) U.S. Cl. ................................ 99/339; 99/403; 99/413; 219/440; 219/439

(58) Field of Search ............................. 99/403, 413, 339, 99/331, 332; 219/431, 440, 429, 430, 432, 433, 438, 439, 447

(56) References Cited

U.S. PATENT DOCUMENTS

| 1,983,118 | * | 12/1934 | Bourque | 219/440 |
| 4,617,452 | * | 10/1986 | Miwa | 219/441 |
| 4,672,179 | | 6/1987 | Onishi et al. | 219/441 |
| 5,092,229 | * | 3/1992 | Chen | 99/403 X |

* cited by examiner

Primary Examiner—Reginald L. Alexander
(74) Attorney, Agent, or Firm—Rabin & Champagne, P.C.

(57) ABSTRACT

A multifunctional electric pressure cooker includes a pot cover, a turning handle, a pot body composed of an inner pot and an outer pot, a housing enveloping the whole pot and devices for controlling temperature, pressure and cooking duration. At the outer side of the pot cover is provided a hollow turning handle. Inside the handle are a lever mechanism and a button cam mechanism for forced pressure release and steam exhaust. When cooking, it is only necessary to turn an indicating cam on a cooking duration and temperature selecting panel. Fuzzy control to cooking will then be achieved.

10 Claims, 3 Drawing Sheets

MULTIFUNCTIONAL ELECTRIC PRESSURE COOKER

FIELD OF THE INVENTION

The present invention relates to a pressure cooking utensil which is a combination of a current electric pressure cooker and an electric rice cooker, and is a kind of a pressure electric steaming pot.

BACKGROUND OF THE INVENTION

Existing electric pressure cookers on sale in the current market have no built-in electric heating device. As such, they can not work under a condition without an outside heating source, and this is an inconvenience for the existing electric pressure cookers. Moreover, electric pressure cookers are not very safe, resulting frequent accidents from overpressure explosions, thus hurting people. Furthermore, existing electric pressure cookers are accompanied by a huge loss of steam, such that cooked foods will lose some of their deliciousness and flavor, and will not achieve original extract and inherent tastiness to give perfect satisfaction.

Existing electric pressure cookers on sale in the current market, despite having a heating source, can only cook under atmospheric pressure, and do not have the advantages and functions of electric cookers.

SUMMARY OF THE INVENTION

An object of the present invention is to provide a new generation of cooking utensils possessing not only an electric pressure cooker pressure cooking function but also automatic control and a self-contained heating source function.

Another object of the present invention is to provide a safety type pressure cooking utensil with a dynamic pressure release type safety pressure control arrangement aiming at solving the safety problems of existing electric pressure cookers.

A further object of the present invention is to provide a new type of electric pressure cooker that exhausts less steam or no steam during cooking, so as to keep the original extract and inherent flavor of foods and to give no greasy smoke pollution for a clean and hygienic environment.

These objects are achieved utilizing a multifunctional electric pressure cooker comprising a pot cover, a pot body, a turning handle cooking setting mechanism, an automatic temperature control mechanism and a built-in electric heating device. The pot body further comprises an outer pot built-in inside of a housing, an inner pot rested in an overlap-sleeve inside the outer pot. The outer pot constitutes an elastic buckle-joint between the pot body and pot cover through a buckle coupling of its elastic pot flange with elastic flange of the pot cover. The inner pot and the pot cover, through a seal ring, form a dynamic hermetic holding chamber able to expand and contract along a vertical direction. The outer pot has a bottom with elastic corrugated slots, which when receiving pressure from an upper side of the inner pot will produce a downward displacement magnitude (deformation magnitude) for controlling pressure and temperature inside the pot and eventually controlling the touch to cut off the power supply to an electric heating disc. In the hollow chamber formed between the housing inner wall and the outer pot outside wall is provided a cooking state setting mechanism to carry on settings using a rotary cam, which further comprises a heat expansion displacement chain constituting an inner pot, heating disc, outer pot bottom and displacement transfer rod at the lower side of the outer pot bottom, which further comprises a preset displacement chain constituting a cam, cam driving rod, and a spiral adjusting rod, between the terminal of the preset displacement chain, which is connected to an electric current flash activate switch. The flash activate switch comprises a pair of contacts and a horizontally arranged spring leaf. The static contact of the flash activate switch keeps a relative static fixation with the displacement transfer rod. While its moving contact is fixed on the lower lateral surface of the spring leaf, the inner end of the spring leaf, through clamping of an insulating bead, keeps a relative static fixed connection with the displacement transfer rod. Its outer end is fixedly connected with the lowest end (terminal) of the vertically arranged preset displacement chain. The displacement transfer rod is generally in a horizontal arrangement. Its inner end is fixedly connected with the outside of the outer pot bottom on the lower lateral surface. A contact head is fixed on its free end, and is always in pressure connection with the arch portion of the flash activate switch spring leaf. The flash activate switch, after receiving a slight contact pressure, will jump in a flash to cut off current supply required by the electric heating device and to stop the entire cooking process. Under common action of two displacement chains, the pressure and temperature are under effective control in the pot during the entire cooking procedure. Between the pot cover and inner pot is provided a dynamic pressure release seal device. The device is mutually formed by a flexible seal ring fixed on the pot cover inner chamber peripheral wall. Pressure release notches are cut on the inner pot upper rim outward-folded annular edge. The flexible seal ring has a skirt ring hanging downward. Under a hermetic state, the skirt ring under action of internal steam pressure is mutually nestled against the inner wall of the inner pot upper rim to completely close the pressure notches. When pressure in the pot increases, the pot cover produces an upward elastic displacement while the inner pot produces a downward displacement. Thus, the skirt ring of the flexible seal ring will move relatively upward. When the displacement makes the skirt ring open, hot steam in the pot will release out through the pressure release notches to lower the steam pressure. Under the action of the elastic force of the elastic cover flange of the pot cover and the elastic pot flange of the outer pot, the pot cover will automatically restore. The turning handle is hollow and is fixed on the top surface of the pot cover to stretch from the pot cover center to a periphery, with a total length slightly larger than a pot cover radius. In the inner chamber, a hollow turning handle is provided for a forced pressure release steam exhaust mechanism, which further comprises a lever mechanism for opening a steam exhaust slide valve, and a button cam mechanism to drive the lever in motion. A pot cover positioning and locking mechanism is provided in the turning handle. The pot cover positioning and locking mechanism is composed of an elastic protrusion head fixed at the horizontal lever terminal, which is able to bounce in a turning handle bottom plate through hole, and a spring to always keep the horizontal lever tail in a downward moving trend, as well as the horizontal lever itself. A steam exhaust slide valve is in the turning handle body at the central portion of pot cover. The steam exhaust slide valve inter-communicates the pot body inside with the outside atmosphere. The steam exhaust slide valve further comprises a slide valve sleeve fixedly connected into an integral unit with the pot cover top surface and a slide valve core able to make axial bouncing in the slide valve sleeve. The fore end of the lever mechanism horizontal lever pierces through the valve sleeve and can poke the slide valve core inside it. In the slide valve core are disposed a vertical passage and a horizontal transverse passage located below its lower portion, both of which form a passage to intercommunicate the pot inside pressure with the outside atmosphere. The lever mechanism further comprises a horizontal lever, a hinge support device for hanging the horizontal lever, a button cam mechanism to drive the lever to make it poke the slide valve core downward for carrying on pressure release and steam exhaust, a spring to keep the lever fore end always in a raising upward trend, and a pot cover positioning elastic protrusion head located at the lever tail to always keep a protruding downward trend. The button cam mechanism further comprises a planar cam fixedly connected into an integral unit with the button, which always keeps an elastic pressure connection with the horizontal lever fore section upper edge. The button executes a forced pressure release and steam exhaust, and is arranged on the lateral vertical surface of the hollow turning handle. The inner pot rests in the sleeve-overlap in the outer pot, with the upper rim annular edge of the inner pot exceeding a certain height over the upper rim annular edge of the outer pot. The pot cover rests by gravity on the inner pot upper rim annular edge. When the pot inside is under an atmospheric pressure state, the skirt ring (flexible seal ring fixed on the inner peripheral wall of the pot cover) projects a certain dimension below the inner pot upper rim to completely cover all pressure release notches cut on the upper rim outward-folded annular edge of the inner pot. After cooking starts, along with an increase in the inner pot inside pressure, the skirt ring of the flexible seal ring under the action of internal steam pressure will nestle against and seal with the inner peripheral wall surface of the inner pot upper rim annular edge. The steam pressure will again make the slide valve core of steam exhaust slide valve at the pot cover center move upward to cut off linking of the transverse passage with the pot inner chamber. Thus, the whole pot will then start pressurized cooking under hermetic heating.

The multifunctional electric pressure cooker of the present invention is operated by first opening the pot cover when cooking. Food to be cooked is placed in the inner pot. The cover is put on, and the pot cover is put on to make the protruding elastic protrusion head on the turning handle bottom plate insert into the corresponding notch on the pot body housing periphery. Then the closing of the cover is completed.

The cam knob (cooking duration and temperature knob) disposed on a selection panel on the pot housing wall surface is turned to align a corresponding graduation (such as chicken, fish, gruel). The electric power is connected, and cooking will then begin.

Along with producing hot steam inside the pot, the internal pressure increase, and the steam exhaust slide valve automatically closes to close off the passage linking the pot body inside with outside atmosphere, so that the cooking will go on according to a preset condition. When pressure inside the pot increases, the dynamic hermetic holding chamber formed by the pot cover and inner pot expands to cause axial (vertical direction) elastic displacement. The displacement is distributed respectively on the pot cover and inner pot. The pot cover produces an upward displacement while the inner pot produces a downward displacement. The downward displacement is the major heat expansion displacement which is going on via the following path, i.e. from the inner pot to the heating disc to the outer pot bottom with corrugated slots to the displacement transfer lever fixed on the lower lateral surface of outer pot bottom. When the displacement is transferred to the terminal of the heat expansion displacement chain (displacement transfer rod), the elastic pressure connection contact head fixed at its outer side end, simultaneously presses the spring leaf arch portion of the flash activate switch downward. The flash activate switch will act at once to cut off the heating power source to the heating disc. At this moment, the steam pressure inside the pot begins to drop, and the dynamic sealing formed by the pot cover and inner pot is kept still. After a duration in which the pressure and temperature are held, when the pot inside temperature lowers to 60° C., the temperature holding switch located in the under side space of the outer pot bottom is turned on. The heating disc is then on again to heat. However, when the inside pot temperature exceeds 80° C., the temperature holding switch automatically cuts off power, and then the heating disc is off too. When the inside pot temperature once again lowers to 60° C., the temperature holding switch once again is connected on, thus cycling round and round to keep the temperature in a holding range of 60° C.–80° C.

In order to prevent too high of an inside pot temperature, a limiting temperature protective switch is set. When the inside pot temperature reaches 240° C.–260° C., the switch will automatically cut off the main power supply, so as to ensure the pot will not be burned. The limiting temperature switch and temperature holding switch are fixed on the heat conducting columns piercing the through holes of the outer pot bottom and hanging downward.

Between the preset displacement and the pot inside pressure intensity value hoped to reach there is a corresponding relationship. Items rather difficult to cook require a larger displacement amount and items rather easy to cook require less displacement amount. This displacement amount is preset by means of the cam knob on the selection panel on the housing. When the knob is turned to an angular position of the maximum rise, the preset displacement is also at a maximum to correspond the position for cooking beef. Under this condition, it requires the maximum heat expansion displacement to enable the flash activate switch, controlling power supply on-off to the heating disc, to actuate. Between the heat expansion displacement reflecting the actual cooking state and the displacement preset through the cooking duration and temperature selection cam, there exists a certain mutually inherent relationship. A different preset displacement to have a corresponding heat expansion displacement can then jointly cause the flash activate switch to actuate, i.e. to a cooking state (such as young chicken) selected by the selection cam. Such a state has a corresponding preset displacement value and that preset displacement value also has a corresponding heat expansion displacement value. When the inside pot internal pressure dynamic rise reaches that displacement value, the flash activate switch will only then execute power cut-off action.

The dynamic seal structure of the electric pressure cooker of the present invention provides a threshold value for the maximum pressure intensity value possible to occur in the pot while in use. This is a threshold value for safety reasons. When steam pressure in the pot reaches this threshold value, the total displacement (in a vertical direction) to make the pot cover separate mutually from the inner pot, will just enable the lower skirt ring of the flexible seal ring to open the pressure release notches distributed on the annular edge periphery of the inner pot upper rim. At this moment, the pressurized steam in the pot is exhausted to the outside atmosphere through pressure release notches distributed on the annular periphery to reach a pressure limiting safety action. This kind of pressure limiting measure can prevent explosion-type accidents from occurring if the electric heater control system is in trouble or damaged, and is unable to cut off the power supply, thus causing a continuous rise of the internal pressure inside the pot, allowing the pressure to reach a dangerous value.

The advantages of the present invention are that the electric pressure cooker integrates the dual functions of an electric pressure cooker and an electric rice cooker into one cooker, and can be used at places merely having electric power but without a gas supply, and allows cooking under a pressurized state. Moreover, the cooker provides absolute safety with multiple usage in one pot, to provide for users the automatic cooking of rice, noodles, meat, poultry, soup and other varieties of foods with a complete function of steaming, boiling, stewing, roasting, braising, etc. An intelligent fuzzy control technique is used to perform automatic cooking of a plurality of foods requiring only one simple action of turning the cooking duration and temperature knob. The food cooked with this electric pressure cooker retains its original extract and inherent flavor, and has the best nutrition and tastiness. During cooking, the cooker has no steam to exhaust and no greasy smoke to pollute, so as to keep the environment clean and hygienic, so as to be rated as a green cooking utensil.

A detailed description to the present pressure cooker in combination with an embodiment is carried on as follows.

DETAILED DESCRIPTION OF THE PREFERRED EMBODIMENTS

Figure 1:
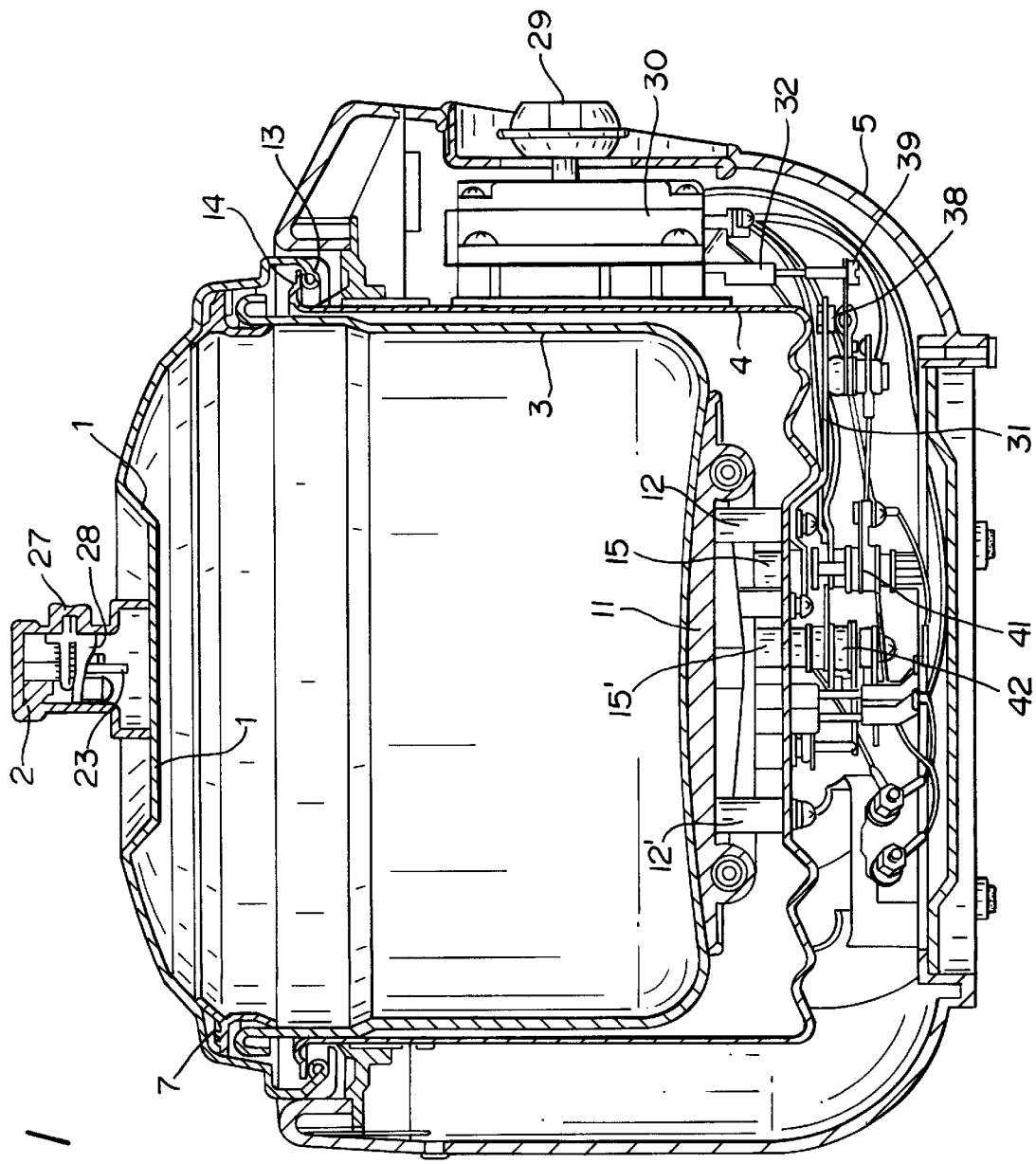
FIG. 1 is an overall sectional view of the embodiment of the present invention.

As shown in FIG. 1, the multifunctional electric pressure cooker of this embodiment comprises a pot cover 1. A turning handle 2 is arranged on the top surface of pot cover 1. A pot body is composed of an inner pot 3 and an outer pot 4. The outer pot overlaps the inner pot in a sleeve manner. A housing 5 envelopes the whole pot body. On the inner chamber peripheral wall of the pot cover 1 is fixedly welded a fixing ring 6 of a "⌈" type cross-section, which forms an annular slot for fixing a flexible seal ring 7. The flexible seal ring 7 has a skirt ring 8 hanging downward and another skirt ring 9 nestling against the inner wall of the pot cover 1 and stretching upward.

Figure 2:
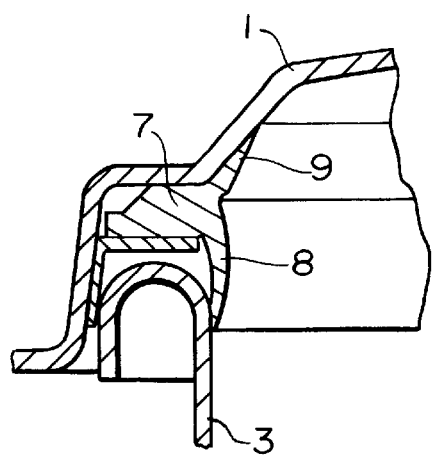
FIG. 2 is a schematic diagram of the pot cover and inner pot under a hermetic state.
Figure 3:
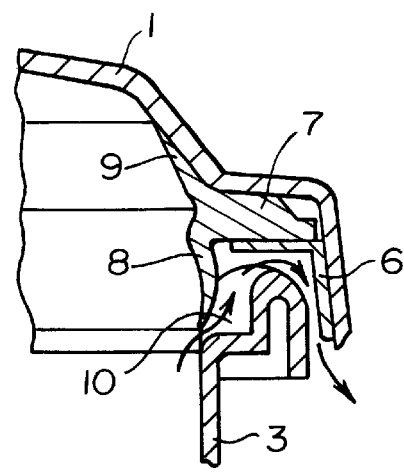
FIG. 3 is a schematic diagram of the pot cover and inner pot under expansion to exhaust steam.
Figure 4:
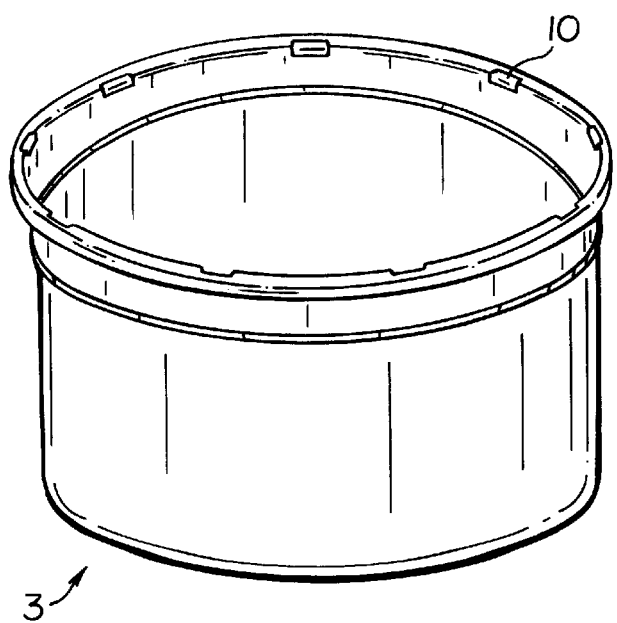
FIG. 4 is a perspective view showing the distribution of pressure release and steam exhaust notches.
Figure 5:
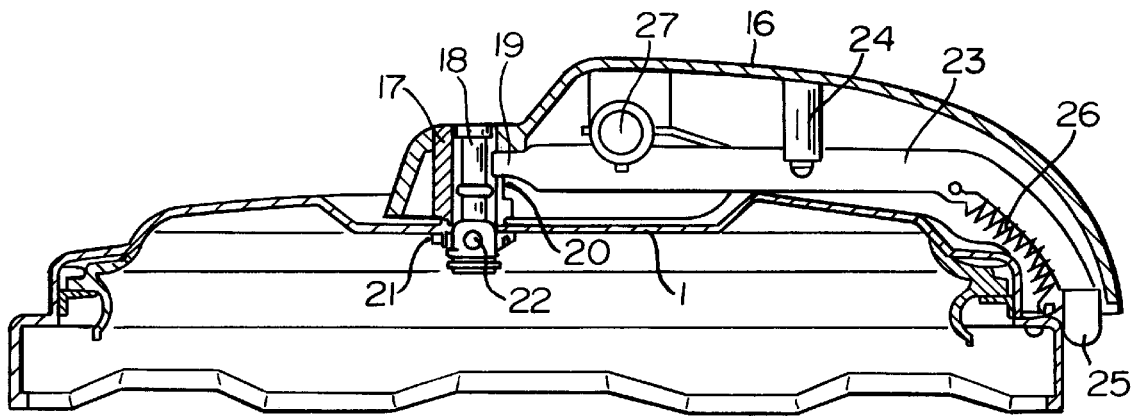
FIG. 5 is a full sectional view of the pot cover and turning handle.
Figure 6:
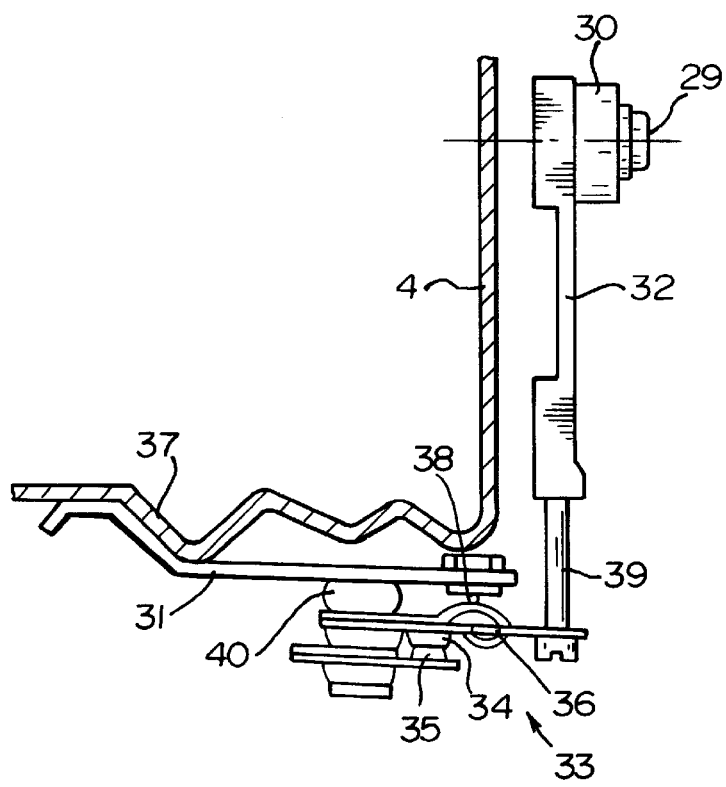
FIG. 6 is a working principle diagram of the cooking duration and temperature adjusting device.
Figure 7:
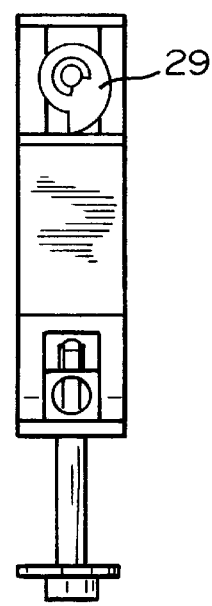
FIG. 7 is a lateral schematic diagram of the cooking duration and temperature adjusting device in FIG. 6.

On the upper rim of the inner pot 3, which is an outward-folded annular edge, are a plurality of uniformly distributed pressure release notches 10. Under a normal cooking state (as shown in FIG. 2), due to the action of hot steam pressure in the inner pot 3, the lower skirt ring 8 and upper skirt ring 9 of the flexible seal ring 7 are both nestled against the inner wall of pot cover 1 to form a dynamic hermetic space between the pot cover 1 and inner pot 3, allowing elastic expanding or contracting along its axial direction (vertical direction). When the internal pressure in the pot body rises to a threshold value, the pot cover 1 produces a mutually separating displacement relative to the inner pot 3, i.e. the pot cover 1 displaces upward while the inner pot 3 displaces downward. The total magnitude of displacement is just enough to make the lower skirt ring 8 of the flexible seal ring 7 open the pressure release notches 10. This will be similar to a condition of a corresponding common electric pressure cooker in which the safety valve is suddenly opened during steaming and boiling when the internal pressure exceeds a normal value. Such a role played by the dynamic seal arrangement is the safety sealing.

The inner pot 3 of this embodiment rests on an electric heating disc 11 with its bottom shape just coinciding with the upper surface of the electric heating disc 11. The heating disc 11 is fixedly connected mutually to the bottom with corrugated slots of the outer pot 4 through legs 12, 12'.

The upper rim annular edge of the inner pot 3 relative to the upper rim annular edge of the outer pot 4 exceeds a certain height. An elastic cover flange 13 of the pot cover 1 and an elastic pot flange 14 of the outer pot 4 buckle with each other after the pot is properly positioned, to form a lockup to prevent both from separating.

Two heat conducting columns 15, 15' hang downward on the lower side surface of the electric heating disc 11, and pierce respectively through holes (not shown) on the pot bottom to stretch outward, and to respectively connect, on the lower side of a bottom surface of the outer pot 4, with a protective switch and a temperature holding switch. The protective switch limits the maximum temperature of the pot body and the temperature holding switch keeps the temperature inside the pot within a range of 60° C.–80° C.

A turning handle 16 is fixed on the top surface of the outer side of the pot cover 1. Turning handle 16 is a hollow shell made of Bakelite, and has a length slightly larger than the pot cover 1 radius so as to stretch toward a periphery of the cover from a central portion of the pot cover along a radial direction. A steam exhaust slide valve is near the central portion in the turning handle body. The steam exhaust slide valve intercommunicates the pot body inner chamber with outside atmosphere. The steam exhaust slide valve further comprises a slide valve sleeve 17 and a slide valve core 18 able to bounce inside the slide valve sleeve along an axial direction. On the cylindrical body lateral wall of a slide valve sleeve 17 is provided a slot or window 20 for inserting a poking head 19. On the cylindrical body outside peripheral wall of the slide valve core 18 are disposed a concave inward holding chamber and a protrusion ring 21 protruding outward from the bottom portion of the holding chamber, both of which will provide conditions for receiving a poking of the poking head 19. An inside of the slide valve core 18 is provided with a vertical passage (not shown) and a horizontal transverse passage 22. When the poking head 19 is poked downward with a downward pushing action toward the protrusion ring 21, the slide valve core 18 will slide down as a whole, thereby exposing the transverse passage 22 in the inner chamber space of the pot cover 1 to intercommunicate the pot body inner chamber space with outside atmosphere. This is the steam exhausting state. The poking head 19 is located at the fore end of a horizontal lever 23. The horizontal lever 23 is pivotal around a horizontal axis through a hinge joint of a suspension column 24 hanging downward from a turning handle shell top surface. An elastic protrusion head 25 is provided at the tail of the horizontal lever 23. Under the action of a spring 26, the elastic protrusion head 25 will always tend to protrude outward from the turning handle bottom plate. The elastic protrusion head 25 and spring 26 make up a pot cover positioning mechanism. When the pot cover 1 is positioned in place in the pot body and the elastic protrusion head 25 is inserted in the corresponding recess (not shown) of the pot housing 5 top surface, the pot cover 1 will be positioned and locked.

On a lateral vertical surface of the turning handle is arranged a button cam mechanism to perform the task of carrying out forced steam exhaust for the pot. The button cam mechanism comprises a button 27 and a planar cam 28 integrally and fixedly connected to the button. The horizontal lever 23, due to the action of the spring 26, has its fore section upper edge always kept in a mutual elastic nestling jointed state with the planar cam 28. This button cam mechanism, during a forced pressure release steam exhaust operation, operates as follows:

(1) First, the button is pressed to make it move inward;
(2) the planar cam 28 pushes the horizontal lever fore section downward; and
(3) along with the downward motion of the horizontal lever fore section, the poking head 19 will then poke the slide valve core 18 downward, thus linking up the passage for pressure releasing steam exhaust, so as to start exhausting the steam.

The electric pressure cooker is provided, in addition to temperature control and cooking timing control, with a pressure control for cooking difficult to cook foods such as beef. Beef needs not only a longer cooking time duration, but also a higher steam pressure within the pot to carry on cooking. In contrast, rice is easy to cook. Therefore, on the panel of the cooking duration and temperature selection outside the pot housing 5, is provided an indicating cam 29 arranged coaxially with a timer 30. In order to control pressure, i.e., by controlling a duration of an energizing time of the heating disc 11, depending on the presence of sufficient water, the longer the energizing time the higher the steam pressure will be in the pot. The cooking setting mechanism further comprises a heat expansion displacement chain composed of inner pot 3→heating disc 11→outer pot bottom→displacement transfer rod 31 below the outer pot bottom, and a preset displacement chain composed of indicating cam 29→driving rod 32→spiral adjusting rod 39. Between the terminals of these two displacement chains is connected a flash activate switch 33 for controlling a power supply to the heating disc 11, to turn the heating disc 11 on and off. The flash activate switch 33 further comprises a moving contact 34, a static contact 35 and a horizontally arranged spring leaf 36. The pair of contacts, composed of the moving contact 34 and static contact 35, control current to the electric heating disc 11, to turn the disc on and off. The flash activate switch 33 is fixedly connected on the displacement transfer rod 31 through an insulating bead 40.

The terminal of the heat expansion displacement chain is horizontally arranged on the displacement transfer rod 31, one end of which is integrally connected and fixed to the bottom outer side of the outer pot with corrugated slots. The free end of the displacement transfer rod 31 is fixedly connected with an elastic pressure connect contact 38 which is always in an elastic pressure connect state with an arch portion of spring leaf 36. The flash activate switch 33 will flash to jump off after receiving a slight contact pressing to cut off power supply current and stop the entire cooking process. Under the common action of the two displacement chains, the pressure and temperature in the pot are effectively controlled during the entire cooking procedure.

The terminal of the present displacement chain is an adjusting screw 39 fixedly and integrally connected with the outer end of the spring leaf 36. The indicating cam, when set at a higher cam rise position such as a cooking beef position, will require a higher heat expansion displacement magnitude to activate the flash activate switch 33, i.e., thus providing for a longer cooking time. In order to adjust the preset displacement chain to have a larger margin, a spiral adjusting rod 39 is connected to the end of the driving rod 32. According to the invention, a limiting temperature protective switch 41 and a temperature holding switch are provided.

While the presently preferred embodiments of the this invention have been shown and described above, it is to be understood that this disclosure is for the purpose of illustration and that various changes and modifications may be made without departing from the scope of the invention as set forth in the appended claims.

What is claimed is:

1. A multifunctional electric pressure cooker, comprising:
   a pot cover having an elastic cover flange;
   a flexible seal ring fixed within said pot cover;
   a pot body, said pot body comprising:
      a housing;
      an outer pot built into the housing, said outer pot including an elastic pot flange that buckles with the elastic cover flange of said pot cover to form an elastic buckle-joint between the pot body and pot cover, said outer pot further having a bottom with elastic corrugated slots that are displaceable in a downward direction; and
      an inner pot disposed within the outer pot in an overlapping relationship, said inner pot and said pot cover, through the flexible seal ring, forming a dynamic hermetic holding chamber able to expand and contract along a vertical direction;
   a turning handle disposed on the pot cover; and
   an electric heating device comprising an electric heating disc;
   wherein the elastic corrugated slots on the bottom of the outer pot are displaceable in a downward direction from pressure exerted from an upper side of said inner pot so as to control and turn off the electric heating disc, thereby controlling a final pressure inside the pot.

2. The cooker according to claim 1, further comprising a cooking state setting mechanism, including:
   a heat expansion displacement transfer chain composed of the inner pot, the electric heating disc, and a displacement transfer rod disposed at a lower side of the bottom of the outer pot;
   a preset displacement chain composed of a rotary cam for setting the cooking state setting mechanism, a driving rod connected to said rotary cam, and a spiral adjusting rod connected to said driving rod; and
   a flash activate switch disposed between said spiral adjusting rod and said displacement transfer rod, and being activated thereby to control power to said electric heating disc.

3. The cooker according to claim 1, wherein said flexible seal ring is disposed on an inner chamber peripheral wall of the pot cover, and forms a dynamic seal pressure release device between the pot cover and the inner pot, wherein the flexible seal ring has a downwardly-hanging skirt ring,
   wherein the inner pot has an upper rim outwardly-folded annular edge having pressure release notches therein, and
   wherein under a hermetic state said skirt ring under an action of steam pressure, is mutually nestled against an inner peripheral wall of the inner pot upper rim annular edge to completely close the pressure release notches.

4. The cooker according to claim 1, wherein said turning handle is hollow, and is fixed onto a top surface of the pot cover, said turning handle extending from a center of the pot cover to a periphery of the pot cover, with a total length of said turning handle being larger than a radius of the pot cover, said turning handle having an inner chamber therein, the inner chamber having a forced pressure release steam exhaust mechanism which further comprises a button cam mechanism, a steam exhaust slide valve, and a lever mechanism, the button cam mechanism driving said lever mechanism to open the steam exhaust slide valve.

5. The cooker according to claim 4, wherein said turning handle includes a bottom plate, and a pot cover positioning and locking mechanism within the inner chamber of the turning handle, the pot cover positioning and locking mechanism comprising an elastic protrusion head projectable through a hole in the bottom plate and connected to a tail of the lever mechanism, and a spring urging the tail of the lever mechanism in a downward direction.

6. The cooker according to claim 4, wherein the steam exhaust slide valve is disposed in a body of the turning handle near the center of the pot cover, the steam exhaust slide valve intercommunicating an inside of the pot body with an outside atmosphere, the steam exhaust slide valve comprising a slide valve sleeve, and a slide valve core axially movable within the slide valve sleeve, the slide valve core having a vertical passage and a horizontal transverse passage formed therein.

7. The cooker according to claim 6, wherein the lever mechanism further comprises a horizontal lever, and a hinge support device for hanging the horizontal lever, wherein the button cam mechanism drives a fore end of the lever downward to poke the slide valve core and move the slide valve core in a downward motion, and wherein a pot cover positioning elastic protrusion head is located at a rear end of the lever.

8. The cooker according to claim 7, wherein the button cam mechanism comprises a button and a planar cam fixedly connected to the button and being kept in elastic pressure contact with an upper edge of said horizontal lever, the button being arranged on a lateral vertical surface of the turning handle.

9. The cooker according to claim 2, wherein the displacement transfer rod is fixed, in a horizontal arrangement, on a lower lateral surface of the bottom of the outer pot, the displacement transfer rod having a free end, and having a contact head fixed on a lower lateral surface of the free end, the flash activate switch having a spring leaf with a spring leaf arch portion, the contact head being in constant elastic pressure contact with the spring leaf arch portion, the flash activate switch further having a static contact kept in relative static fixation with said displacement transfer rod, and having a moving contact fixed on a lower lateral surface of the spring leaf, the spring leaf being horizontally arranged, and having an inner end fixedly connected through an insulating bead with the displacement transfer rod, the spring leaf further having an outer end fixedly connected with an adjusting screw to the spiral adjusting rod of the preset displacement chain.

10. The cooker according to claim 1, wherein a bottom surface of the inner pot is nestled against an upper surface of said heating disc, wherein said heating disc is fixedly connected to the bottom of the outer pot, wherein a lower lateral surface of said heating disc is provided with two heat conducting wiring columns which pierce through the bottom of the outer pot and are connected with a limiting temperature controller for protecting the heating disc and a temperature holding switch.

* * * * *